(12) United States Patent
Letas

(10) Patent No.: US 8,710,689 B2
(45) Date of Patent: Apr. 29, 2014

(54) WIND ENERGY SYSTEM HAVING A CONNECTION PROTECTION DEVICE

(75) Inventor: Heinz-Hermann Letas, Suesel (DE)

(73) Assignee: Senvion SE, Hamburg (DE)

( * ) Notice: Subject to any disclaimer, the term of this patent is extended or adjusted under 35 U.S.C. 154(b) by 246 days.

(21) Appl. No.: 12/937,968

(22) PCT Filed: Apr. 14, 2009

(86) PCT No.: PCT/EP2009/002728
§ 371 (c)(1),
(2), (4) Date: Oct. 14, 2010

(87) PCT Pub. No.: WO2009/127393
PCT Pub. Date: Oct. 22, 2009

(65) Prior Publication Data
US 2011/0031762 A1    Feb. 10, 2011

(30) Foreign Application Priority Data

Apr. 14, 2008  (DE) .................. 10 2008 018 748

(51) Int. Cl.
*F03D 9/00*   (2006.01)

(52) U.S. Cl.
USPC .......................................... 290/55

(58) Field of Classification Search
USPC .................................... 290/44, 55
See application file for complete search history.

(56) References Cited

U.S. PATENT DOCUMENTS

| | | | |
|---|---|---|---|
| 7,245,185 B2 * | 7/2007 | Litovsky et al. | 330/297 |
| 7,531,911 B2 * | 5/2009 | Rivas et al. | 290/44 |
| 7,679,943 B2 * | 3/2010 | O'Bryant et al. | 363/65 |
| 7,692,321 B2 * | 4/2010 | Jones et al. | 290/43 |
| 2002/0110007 A1 | 8/2002 | Kalman et al. | |
| 2007/0121354 A1 | 5/2007 | Jones et al. | |

FOREIGN PATENT DOCUMENTS

| | | |
|---|---|---|
| CN | 1886593 | 12/2006 |
| DE | 103 44 392 | 6/2005 |
| DE | 10 2007 005 165 | 8/2007 |
| EP | 1 821 382 | 8/2007 |
| JP | 5-300659 | 11/1993 |
| WO | WO-01/73518 | 10/2001 |
| WO | WO 2008031433 A1 * | 3/2008 |

OTHER PUBLICATIONS

International Search Report and Written Opinion mailed Oct. 1, 2009, directed to PCT/EP2009/002728; 3 pages.

* cited by examiner

*Primary Examiner* — Tulsidas C Patel
*Assistant Examiner* — Sean Gugger
(74) *Attorney, Agent, or Firm* — Morrison & Foerster LLP

(57) ABSTRACT

A wind energy installation includes a rotor, a generator driven by the rotor, and a converter for generating electrical power which is output into a power supply system via a transformer. The installation also includes an open-loop control system having an open-loop converter control unit. The open-loop control system supplies an actuating signal for a reactive component to the converter. The installation further includes a voltage measurement device arranged on the transformer. The voltage signal of the voltage measurement device is applied to an input of a state-dependent setpoint value shifter, whose output signal is applied to a limitation module for the reactive component acting on the converter. With this configuration, the installation can be better protected and the transformer can be better utilized.

17 Claims, 7 Drawing Sheets

Fig. 1
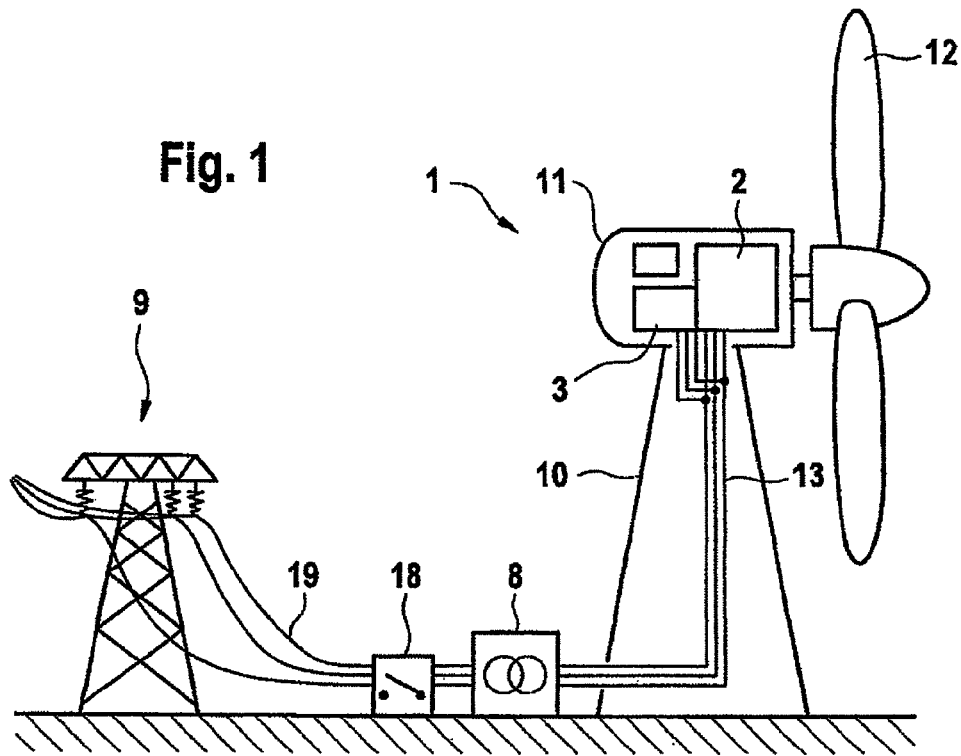

b) 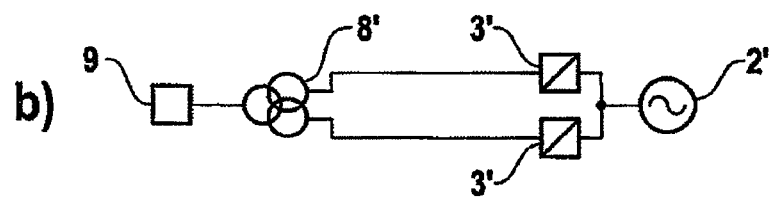
c) 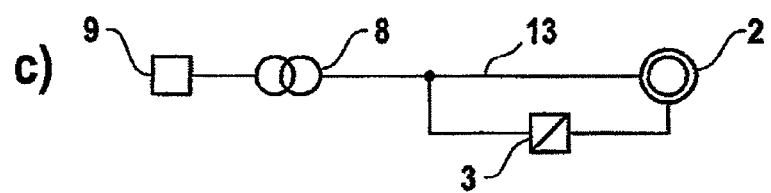
d) 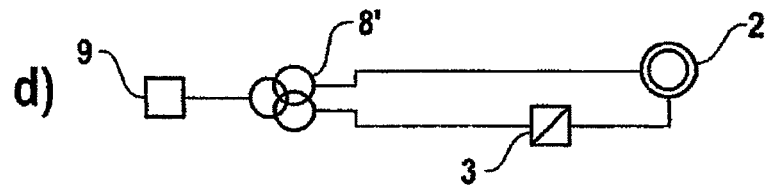

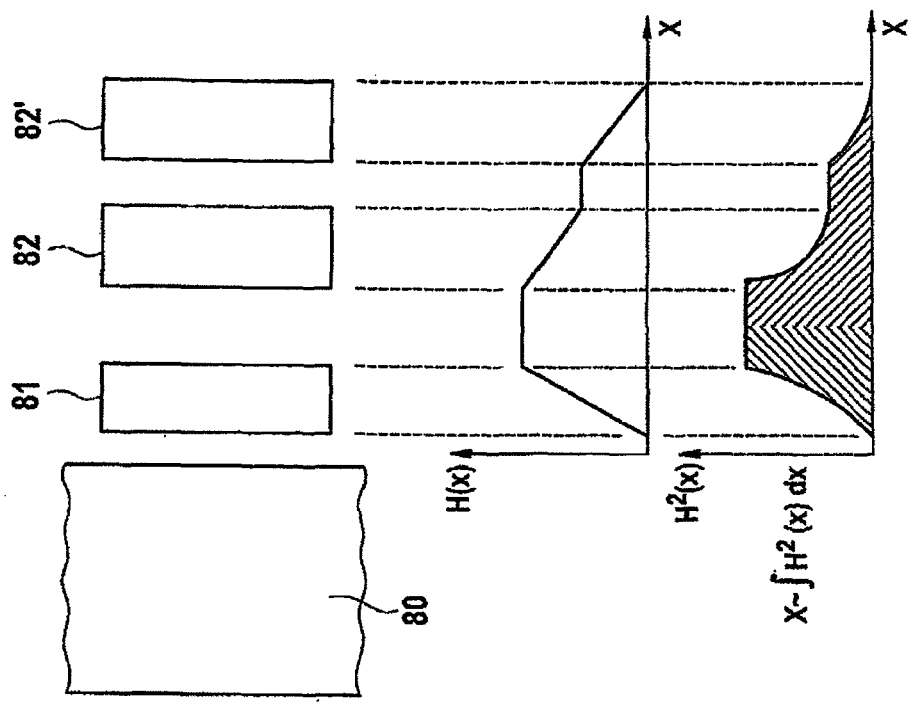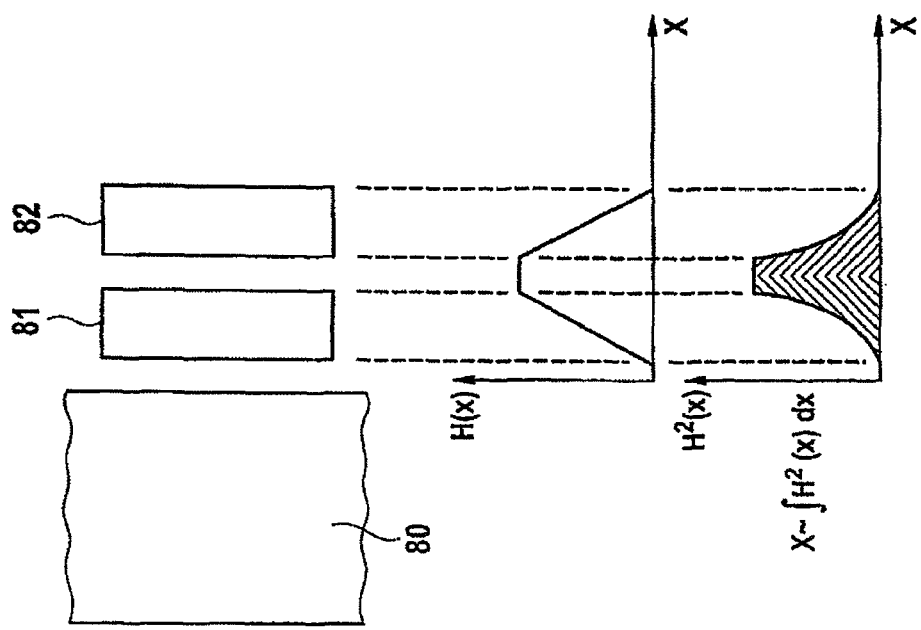
Fig. 4

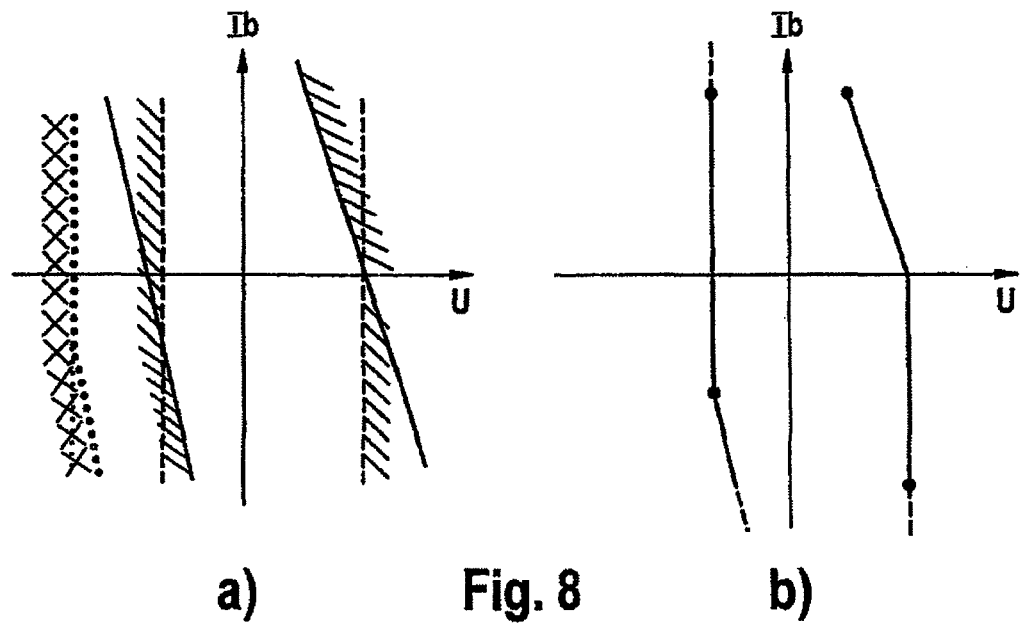
a) Fig. 8 b)
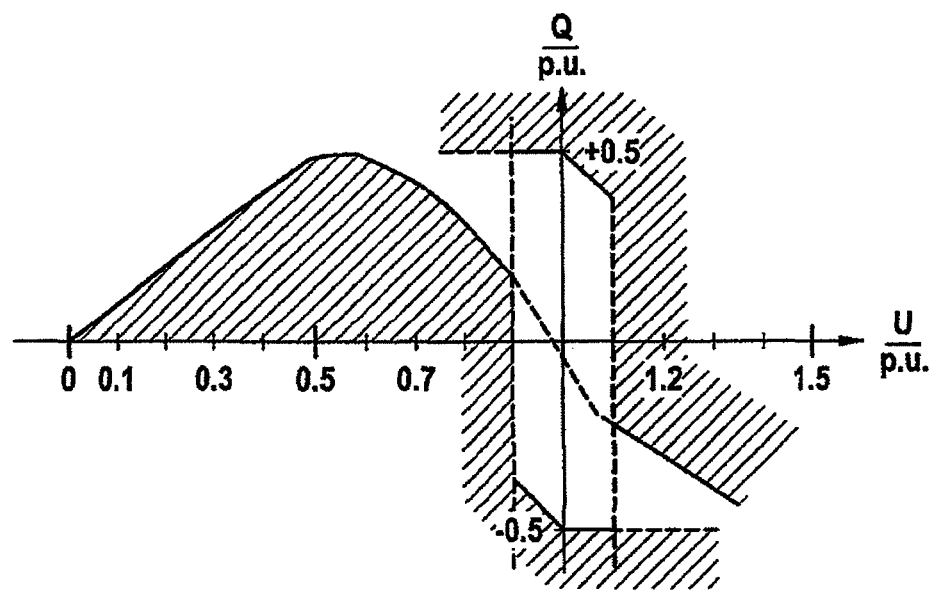
Fig. 9

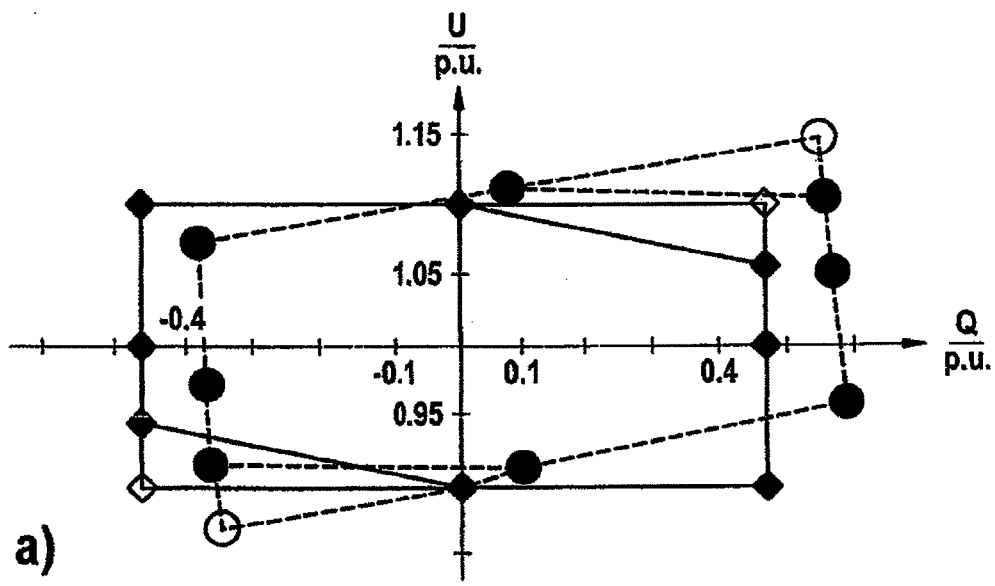
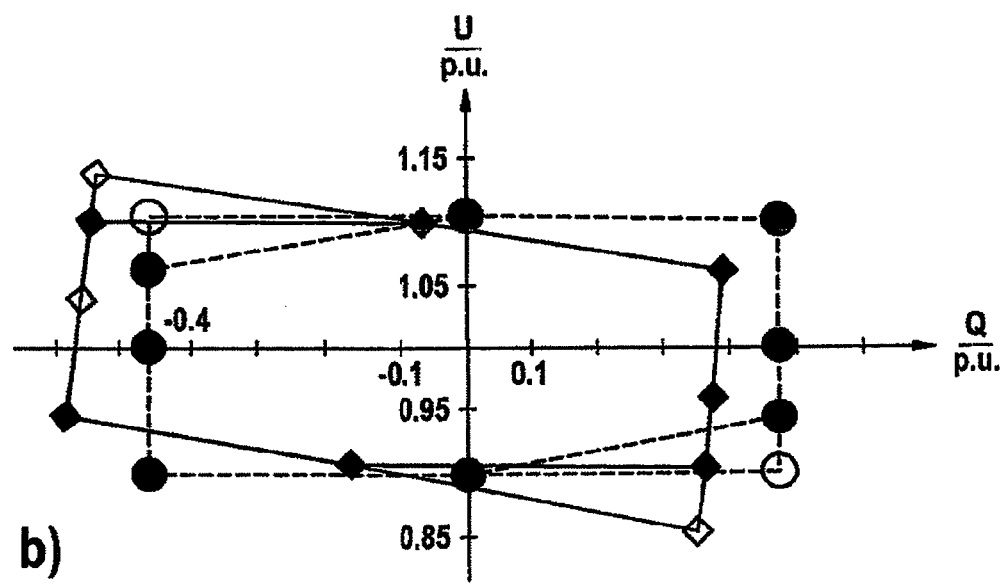
Fig. 10

WIND ENERGY SYSTEM HAVING A CONNECTION PROTECTION DEVICE

REFERENCE TO RELATED APPLICATIONS

This application is a national stage application under 35 USC 371 of International Application No. PCT/EP2009/002728, filed Apr. 14, 2009, which claims the priority of German Patent Application No. 10 2008 018 748.8, filed Apr. 14, 2008, the contents of which prior applications are incorporated herein by reference.

FIELD OF THE INVENTION

The invention relates to a wind energy installation with a rotor, a generator driven thereby and having a converter for producing electrical power which is output into a power supply system via a transformer, for which voltage monitoring is provided, and an open-loop control system, which comprises an open-loop converter control unit, with the result that it is possible to adjust a reactive component of the output power.

BACKGROUND OF THE INVENTION

Wind energy installations are generally connected to a power supply system for transmitting electrical power via a transformer. The transformer serves the purpose of raising the comparatively low voltage level present at the wind energy installation itself to a higher voltage level (medium voltage or high voltage) of the power supply system. Generally, wind energy installations produce the electrical power at a voltage level of up to 1 kV (a frequently used voltage is 690 volts), and these wind energy installations are connected to a medium-voltage power supply system (voltage range approximately 20 kV) by means of the transformer; some more recent wind energy installations with a high power, such as the REpower 5M or 6M can provide the power output thereby at a medium voltage level as well, with the transformer being located within the wind energy installation. The transformers transmit all of the power generated by the wind energy installation and are therefore subjected to a high load, in particular in the case of relatively high load states. For protection against over-loading, it is therefore known to provide a monitoring device for the transformer. It is known to provide a voltage measurement on one side of the transformer. This voltage measurement is used to determine whether the voltage is in a predetermined range in order thus to isolate the wind energy installation from the power supply system by way of precaution in the event of said voltage departing from the predetermined range.

In wind energy installations with powers in the range of up to 2 MW, it is conventional that the voltage on the low-voltage side of the transformer, i.e. on the side of the wind energy installation, is monitored. This arrangement provides the advantage of effective protection of the wind energy installation and of the transformer. However, it has the disadvantage that depending on the load case as a result of the transformer voltage differences of up to 5% may arise in comparison with the theoretical transformation ratio. There is therefore the risk of excessive voltage discrepancies occurring on the high-voltage side of the transformer, i.e. of the desired range not being adhered to. In other more powerful wind energy installations, the opposite concept is often used. This consists in the voltage on the high-voltage side of the transformer, i.e. on the system side, being monitored. This arrangement provides the advantage of improved monitoring of the response of the wind energy installation on the power supply system to be protected. However, in this case too, the situation occurs in which, via the transformer, impermissible voltage discrepancies can arise on the other side, in this case the low-voltage side, which amount to more than 5%. In the event that the measuring device is arranged on the high-voltage side of the transformer, there is therefore the risk of the limit values not being adhered to on the low-voltage side. In order to protect the wind energy installation, in this case possibly special measures are required, such as monitoring to ensure that a minimum active power is adhered to (at the expense of a reactive power output which is desired per se) for ensuring a sufficient internal power supply to the wind energy installation (DE-A-103 44 392).

There is in principle the possibility of compensating for the variations in the voltage which are induced by the transformer by selecting the tolerance zone to be correspondingly narrower, but this has the disadvantage that the possible working points for the wind energy installation are therefore (considerably) restricted, which results in a corresponding reduction in the energy yield. The selection of a narrower tolerance range therefore results in a reduction in the efficiency and the block diagram therefore in noticeable losses in terms of profitability.

SUMMARY OF THE INVENTION

The invention is based on the object of specifying an improved wind energy installation of the type mentioned at the outset and an operating method therefore, which avoids the abovementioned disadvantages.

The solution in accordance with the present invention consists in the features broadly described herein.

In the case of a wind energy installation with a rotor, a generator driven thereby and having a converter for generating electrical power which is output into a power supply system via a transformer, for which voltage monitoring is provided, and an open-loop control system, which comprises an open-loop converter control unit, the open-loop control system supplying an actuating signal for a reactive component to the converter, the invention provides that a voltage measurement device is arranged on the transformer, the voltage signal of said voltage measurement device being applied to an input of a state-dependent setpoint value shifter, whose output signal is applied to a limitation module for the reactive component acting on the converter.

First of all, some of the terms used will be explained:

A reactive component is understood to mean an electrical parameter which indicates the level of the reactive portion of power or current. It is therefore of no importance for the invention whether the reactive component relates to power or current. If desired, it is possible to convert between the two variables taking into consideration the voltage. In order to provide a clearer explanation, the reactive component is assumed to be reactive current in the text below; the statements apply accordingly to the reactive power.

State-dependent is understood mean that the value for the voltage, the current and/or the power is applied as a signal to the setpoint value shifter. In this case, the value can be measured directly or can be determined indirectly from other variables.

The invention is based on the concept of operating the wind energy installation by means of a targeted supply of reactive current depending on the voltage in such a way that not only protection of the wind energy installation itself, but also protection of the transformer and of the power supply system is provided, in particular against excessive voltages. The invention has identified that a key to the problem of the risk of impermissible voltages at the transformer consists in the reactive component of the transformer. Specifically, the key consists in that the reactive current flow through the transformer changes the internal emf of the transformer and therefore the voltage on the low-voltage side by a considerable amount (which can reach and exceed a few percentage points). This means that, in addition to the tolerance on the system side, the voltage on the low-voltage side which likewise has to remain within a specific tolerance zone is changed as a result of the reactive current flow through the transformer.

The invention has recognized this relationship between the voltage response beyond the transformer and the flow of the reactive component and makes use of this relationship for the purposes of achieving the object according to the invention. In this regard, it envisages implementing targeted guidance of the reactive component as a function of the voltage at the transformer, to be precise in the form of the setpoint value shifter provided in accordance with the invention. The invention makes use of the fact that modern wind energy installations not only feed active power into the power supply system but also are designed for outputting reactive power; for this purpose, the wind energy installation has an adjustment possibility, via which a reactive component, such as reactive current portion, reactive power value or a power factor, can be adjusted. Such forms of closed-loop control are known per se. The invention begins here by supplementing the already existing form of closed-loop control by bringing about a change in the reactive power measure provided, if required, by means of the setpoint value shifter provided according to the invention which is dependent on the voltage or reactive power state of the wind energy installation and the power supply system, in particular the voltage at the transformer, in order thus to restrict the voltage at the transformer (which is largely determined by the internal emf) by targeted guidance of the reactive component. This generally takes place in such a way that, in the event of overvoltages in the power supply system, the reactive component is shifted toward the underexcited status by the state-dependent (in this case voltage-dependent) setpoint value shifter. For the reactive current, this means that it (as in the generator reference-arrow system) becomes negative in the event of underexcitation. Thus, both the voltage in the upstream power supply system is decreased by the voltage drop at reactances of the power supply system as well as on the low-voltage side of the transformer and at the wind energy installation. The state-dependent setpoint value shifter acts in a corresponding manner in the event of an undervoltage in the power supply system as a result of a change in the reactive component toward the overexcited status, as a result of which the voltage in the upstream power supply system, as well as on the low-voltage side of the transformer and the wind energy installation, is increased as a result of the voltage drop at the system reactances. The effects of impermissible overvoltages and undervoltages are thus successively reduced (for example from a 30% deviation in the high-voltage system to 20% in the medium-voltage system and only 15% at the wind energy installation).

The invention therefore achieves, with only slight additional complexity, the combined protection, i.e. protection of the power supply system, of the transformer and of the wind energy installation. In this case, it is in principle not important whether the monitoring of the voltage at the transformer takes place on the high-voltage side or on the low-voltage side thereof. In both cases, the protection which was originally not provided on the respective other side is achieved by means of the functionality according to the invention. The generally already existing hardware for measuring the transformer voltages on one side of the transformer (whether it be on the high-voltage side or on the low-voltage side) is therefore sufficient for the invention. Additional complexity in terms of hardware is therefore not required for the invention, or only to a minimal extent, since existing measured variables can be used.

In addition, the invention enables improved utilization of the transformer. Overdimensioning, as has been provided until now as a result of the tolerance limit being exceeded for the voltage, is therefore no longer necessary. It is thus possible for smaller and more efficient transformers to be used. At the same time, both the protection of the power supply system and that of the wind energy installation are improved.

In order to achieve a response of the setpoint value shift which is as quick as possible, the setpoint value shifter expediently acts directly on the converter. This is understood to mean both a direct action on the active switching elements of the converter and on its rapid-response open-loop converter control unit. A rapid-response open-loop converter control unit is understood to mean that control loop which, in turn, acts directly on the active elements of the converter; a distinction should be drawn between this and the generally much slower open-loop control loops of the open-loop operation control unit itself. Thus, a markedly improved response of the wind energy installation in the power supply system in terms of withstanding transient phenomena is achieved, such as, for example, short-term voltage peaks (HVRT—high voltage ride through) or short circuits (LVRT—low voltage ride through).

In order to increase the effect according to the invention of the setpoint value shifter, provision can furthermore be made for said setpoint value shifter to interact with a load shifting module, which acts on the open-loop control system in the event of an undervoltage or overvoltage in such a way that the active portion of the output power or the current is reduced in favour of the reactive portion. Thus, open-loop priority control is achieved in which the active currents are reduced if necessary in order to be able to use the (restricted) current capacity of the converter to a greater degree for producing reactive current. The contribution which wind energy installations make to the support of the power supply system precisely at times of high load is therefore significantly increased. The additional complexity required for this is minimal, however, and the resultant losses in terms of profitability owing to the reduced active power delivery are likewise negligible since such a shift is used with a duration of only a few milliseconds as a result of the open-loop priority control in the case of dynamic voltage discrepancies (HVRT, LVRT).

Preferably, a temperature sensor for the transformer is provided whose signal is applied, as further state signal, to an input of the setpoint value shifter. Preferably, the temperature sensor is arranged on the core of the transformer. This is based on the knowledge according to the invention that, owing to the significance of the reactive component for the loading of the transformer, the transformer core needs to be subject to particular monitoring since it is generally heated exclusively by the applied voltage, to be precise the internal emf. It is thanks to the invention that it has been recognized that the loading of the transformer by active current transmission can be insignificant for the problem of interest here, specifically in particular in the case of (cast resin) transformers with forced ventilation. The invention has identified that a critical situation can arise for the transformer even when the system voltage alone is high, as a result of which the transformer can overheat even off load, if no countermeasures are taken in accordance with the invention. The invention has further identified that the internal emf is influenced substantially by the reactive component transmitted via the transformer during operation with reactive power in addition to the voltage, with the result that, during overexcited operation, impermissible heating and therefore shutdown may occur as a result of the associated high core losses in the core. This is counteracted by the arrangement of the temperature sensor on the core in conjunction with the setpoint value shifter according to the invention.

Preferably, the open-loop control system furthermore has an open-loop operation control unit, for which a second identical setpoint value shifter is provided. Identical is in this case understood to mean that the setpoint value shifter has substantially the same functionality as that described above but, if necessary, the dynamic response can be slower for the purpose of a more simple implementation in order thus to provide better matching to the generally much slower sampling rate of the open-loop operation control unit. By means of this second setpoint value shifter, it is possible to achieve monitoring of the functionality according to the invention; in particular it is possible for a wind energy installation to be shut down if the calculation by means of the second setpoint value shifter shows that, primarily during quasi-steady-state or steady-state operation, it would nevertheless be possible for a limit value to be exceeded. By virtue of the monitoring thus achieved of the setpoint value shifter according to the invention, the safety of a correspondingly equipped wind energy installation is increased. A low sampling rate is preferably understood to mean a sampling rate which is at least an order of magnitude (1:10) less than that of the abovementioned setpoint value shifter in accordance with the invention.

Preferably, a measure for the reactive component output by the wind energy installation is applied to a further input of the second setpoint value shifter. This makes it possible for a voltage signal for the setpoint value shifter to be tapped off on any desired side of the transformer (depending on where measurement hardware is already provided) and, if necessary, for the voltage measurement values on the other side of the transformer to be calculated taking into consideration the reactive component transmitted by the transformer. The provision of measurement hardware on one side of the transformer is therefore sufficient, with the result that, in addition, it is not required on the other side.

Preferably, the open-loop control system further comprises a monitoring module, which interacts with a system protection relay with a variable limit value, whose limit value is also determined by the output reactive component. The setpoint value shift according to the invention can therefore also be used for driving the system protection relay, with the result that the improved switching response also favors the protection of the wind energy installation.

Preferably, the setpoint value shifter is designed in such a way that it comprises a PI controller with a limiter. The measured value for the voltage at the transformer, preferably on the low-voltage side, is applied to an input connection of the controller and, in the process, a difference with respect to a maximum voltage is formed. This value is passed for the P element and, for steady-state accuracy, via the I element of the controller, the parameters being determined in such a way that a signal for a reactive component (for example $Q_{upper\ limit}$ or $I_{upper\ limit}$) is output as output power. This signal is passed via the limiter, which limits it to an adjustable value for minimum and maximum values. Expediently, a two-loop controller structure is provided, with one loop being provided for an upper limit, as described above, and a second loop being provided for a lower limit with a corresponding design. One loop is then used for overvoltage and the other for undervoltage. The PI controller is advantageously designed in such a way that a correction value for the reactive component is determined from a voltage difference with respect to a limit value, whether this be a maximum or a minimum limit value. The reactive component may be, as described above, a measure of a reactive power or a reactive current. Such a structure provides the advantage that it is conceptionally simple. However, a measurement of the voltage on the low-voltage side of the transformer is required. Advantageously, therefore, the closed-loop control concept can be combined with a section model of the transformer, with the result that a measurement of the voltage on the system side of the transformer is sufficient and equivalent measured values can be determined via the section model. The additional complexity involved for a separate measurement point on the low-voltage side is then dispensed with.

In another, preferred embodiment, the setpoint value shifter is designed in such a way that it has an open-loop reactive component control unit and a limiter. An open-loop control unit has the advantage over closed-loop control that, thanks to the lack of feedback, it can operate very quickly and virtually without any delay. More rapid limitation and therefore improved and more targeted protection, in particular for the sensitive electronics of the wind energy installation, can therefore be achieved. The open-loop control unit further provides the advantage that the determination of controller parameters which is generally complex is not required. Preferably, the open-loop reactive component control unit is designed in such a way that it determines a reactive component correction value directly from signals for the voltage and the reactive power. For this purpose, the open-loop reactive component control unit is preferably in the form of a two-dimensional characteristic element. This is understood to mean an element which contains limit curves for permissible voltage/reactive power or reactive current combinations. Alternatively, provision can also be made for a setpoint value matrix to be provided instead of the characteristic element. Such a setpoint value matrix is particularly suitable for implementation in a computer, for example in the form of an LUT (look-up table). This opens up the possibility of designing the limit curves to be nonlinear; furthermore, continuous, but non-smooth curve profiles can also easily be provided. As is also the case for the embodiment with closed-loop control, preferably a two-loop open-loop control structure with one loop for overvoltage and one loop for undervoltage is provided. Likewise, as in the variant with the closed-loop control, provision can be made for measured values to be obtained on the other side of the transformer and to be converted by a section model.

Optionally, a separate characteristic for a dynamic operation case can be provided. For this purpose, the characteristic elements are preferably designed such that a further characteristic is implemented and the system is switched over to the other characteristic in the event of a switchover signal being applied. The open-loop operation control unit preferably has a dynamic open-loop control module, which outputs the switchover signal in accordance with predeterminable criteria. With the additional characteristic, limit values can be stepped up temporarily, for example more current can be fed by the converter. Thanks to the limitation to dynamic cases, there is nevertheless no damage as a result of thermal overheating. The same can be provided with respect to the parameters in the closed-loop control.

The invention extends further to a system protection method for wind energy installations with a rotor, a generator driven thereby and having a converter for producing electrical power which is output into a power supply system via a transformer, at which a voltage is monitored, and an open-loop control system, which comprises an open-loop converter control unit, a reactive portion of the output power being adjusted via a reactive component, characterized by measurement of a voltage at the transformer, determination of a correction signal for the reactive component by means of a state-dependent setpoint value shifter, and the use of this correction signal for limiting the reactive component.

Reference is made to the description above for a more detailed explanation of the method.

BRIEF DESCRIPTION OF THE DRAWINGS

The invention will be explained below with reference to the drawings, in which advantageous exemplary embodiments are illustrated and in which:

FIG. 1 shows an overall view of a wind energy installation, which is connected to a power supply system via a transformer;

FIG. 4a, b show the winding arrangement and magnetic field characteristics relating to FIG. 3;

FIG. 8 shows limits curves for a characteristic element for the second exemplary embodiment;

FIG. 9 shows an alternative design of the characteristic element; and

FIG. 10 shows voltage/reactive power graphs for the transformer without and with the invention.

DETAILED DESCRIPTION OF THE INVENTION

Figure 2:
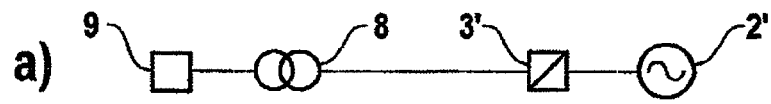
FIG. 2 a-d show circuit diagrams of various connection types via a transformer.

For reasons of clarity, the design of a wind energy installation, as is used for the basis of the exemplary embodiment of the invention explained below, will first of all be explained with reference to a schematic example. A wind energy installation which, overall, is denoted by the reference numeral 1 comprises a tower 10 with a power house 11 arranged at the upper end thereof such that it can rotate in the azimuth direction. A wind rotor 12 is arranged on one end side thereof in such a way as to be capable of performing a rotary movement and drives a generator 2 for producing electrical energy via a rotor shaft (not illustrated). The generator 2 can be of any desired type, and is generally a synchronous or a double-fed asynchronous machine. The generator 2 is connected to a converter 3. A connecting line 13, which passes through the tower 10 to a medium-voltage transformer 8 arranged at the tower base is connected to said converter 3. A line circuit breaker 18 is associated with the medium-voltage transformer 8. The medium-voltage transformer 8 outputs the electrical power produced by the wind energy installation 1 to a power supply system 9 via a system connecting line 19. The power supply system 9 may be a public energy transmission system or an internal power supply system of a wind farm.

The flow of electrical power which is produced by the generator 2 under the force of the wind rotor 12 is illustrated in different embodiments of the wind energy installations in FIG. 2. FIG. 2A shows an embodiment with a full converter 3'. In this case, the generator 2' is in the form of a synchronous generator, for example, and can rotate with any desired speed as a function of the wind strength, wherein the electrical energy produced thereby has a frequency corresponding to the speed of the wind rotor 12. The converter 3' consists of (not illustrated individually here) a generator-side inverter, a system-side inverter with an intermediate circuit arranged therebetween. The alternating current produced by the generator 2' is converted by the machine-side inverter into direct current or DC voltage and fed into the intermediate circuit, from where it is fed into the power supply system 9 via the system-side inverter at a frequency which corresponds to a system frequency via the transformer 8. With this design, all of the electrical power produced by the generator 2' flows via the converter 3. From there, it is fed, via the connecting line 13 and the transformer 8 and the system line 19, into the power supply system 9.

FIG. 2B shows a variant in which the transformer 8' is in the form of a three-winding transformer with two low-voltage windings. A converter 3' is connected to each winding and is connected jointly to the generator 2'. Thus, the power produced by the generator 2 is split between two branches, with the result that each converter 3' needs to transmit less power. This is significant for high-power wind energy installations. It goes without saying that this spliting principle can also be used for three or more branches.

FIG. 2C shows a variant in which the generator 2 is in the form of a double-fed asynchronous generator. Said generator comprises a stator winding (external circuit) and a rotor winding (internal circuit). The stator winding is connected rigidly to the connecting line 13 and the transformer 8 and, via said components, to the power supply system 9. The rotor winding is connected to the converter 3, whose other end is connected to the connecting line 13. With this design, only some of the power produced by the generator 2 flows via the converter 3 (generally approximately one third), while the majority flows directly via the transformer 8 into the power supply system 9. The converter 3 can therefore be provided with smaller dimensions in this design.

FIG. 2D shows a variant of FIG. 2C in which, in turn, a three-winding transformer 8' is used which has two low-voltage windings. The stator of the generator 2 is connected directly to one low-voltage winding, while the rotor is connected to the other low-voltage winding via the converter 3. Preferably, the low-voltage windings are designed for different voltage levels, with the result that a higher voltage level prevails at the low-voltage winding, which is connected to the stator, than at the low-voltage winding which is connected to the converter. This makes it possible to efficiently connect even wind energy installations with a very high power (such as 3000 kW or more).

Figure 3:
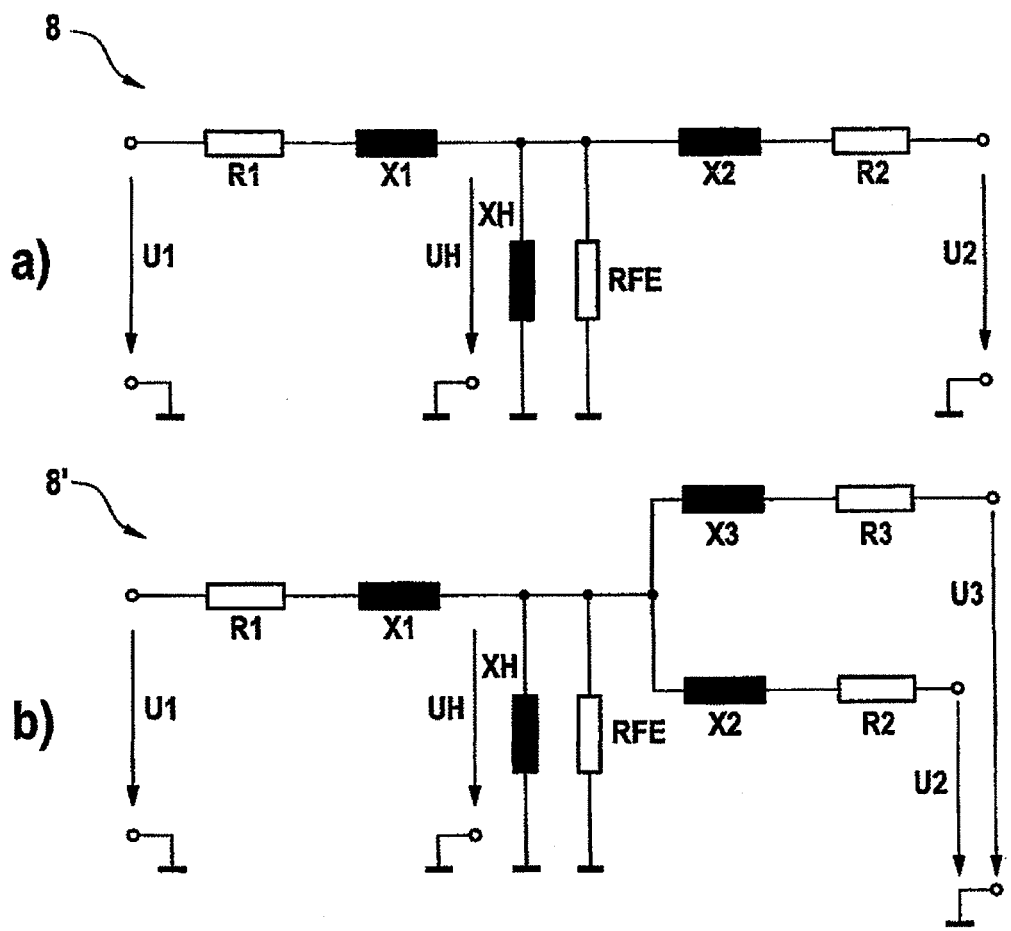
FIG. 3a, b show equivalent circuit diagrams of the transformer.

As can be seen from the description above, considerable significance is attached to the transformer 8, 8' to the extent that, in each variant, all of the power flows via said transformer. Its design and its electrical block diagram will be explained briefly below. FIG. 3A illustrates a single-pole equivalent circuit diagram of a transformer 8 with two windings, and FIG. 3B illustrates a single-pole equivalent circuit diagram of a transformer 8' with three windings. In this case, the voltages U1, U2 and possibly U3 denote the voltages of the three windings, with the numeral 1 identifying the high-voltage side and the numeral 2 and possibly numeral 3 identifying the windings of the low-voltage side. Correspondingly, the resistances R1, R2 and possible R3 represent the nonreactive resistance of the windings and are a measure of the winding losses. The reactances X1, X2 and possibly X3 represent winding leakage reactances. XH denotes the magnetizing reactance which brings about the actual magnetization of the transformer 8, 8'. Connected in parallel with this is a resistance RFE which represents the nonreactive losses of the magnet core. It is noted that, during operation, said reactances and resistances represent voltage dividers for the voltage drop across the magnetizing reactance XH, which voltage is referred to as internal emf UH.

The winding arrangement and the corresponding profile of the leakage reactance X are illustrated in FIG. 4A for low-voltage transformers and in FIG. 4B for medium-voltage transformers.

Owing to the thermal loading of the transformer, the windings 81, 82 are not directly on a transformer limb 80, but there is a gap for passing cooling medium through (forced cooling) between said windings. The winding which is arranged tightly on the transformer limb 80 is the winding 81 for the low voltage (owing to the smaller insulation gaps required) and the winding 82 which is arranged a greater distance away is that for the high voltage. The first graph shows, beneath the illustration of the winding arrangement, the resultant magnetic field strength H over the location x, in a manner matched to the physical arrangement of the windings. In accordance with Ampere's circuital law, said magnetic field strength increases from the inside outward beyond the first winding, the low-voltage winding 81, reaches a maximum in the air gap with respect to the high-voltage winding 82 and then falls linearly again until, finally, it falls back to the initial value on the outside of the high-voltage winding 82. The graph beneath this illustrates the square of the magnetic field strength, with the enclosed area being highlighted by hatching. When considered mathematically, the area is the integral of the square magnetic field strength, i.e. a measure of the inductance X. The leakage inductance X2 of the low-voltage winding 81 is shown in the left-hand half of the graph, and the leakage inductance X1 of the high-voltage winding 82 is shown in the right-hand half, and both together give the total leakage inductance X. FIG. 4B shows a corresponding illustration of a medium-voltage transformer with a split high-voltage winding 82, 82', which has a further cooling gap between the subwindings 82 and 82' for improved cooling. The profile of the magnetic field strengths H and therefore also of the inductance X follows the principles explained above.

It can be seen that the greatest value of the reactance X is achieved in the region of the interspace between the low-voltage and high-voltage windings 81, 82. Correspondingly, the internal emf which is determined critically by the magnetizing reactance has its maximum value at this point. It can therefore be said that, in the case of conventional transformers with typical values for the resistances R1, R2 and possibly R3 and X1, X2 and possibly X3, a voltage drop of approximately 1% is produced in phase with the voltage by the resistances, while a voltage drop of generally less than 10%, usually around 6%, is produced as a result of the reactances transversely with respect to the voltage. The total reactance comprises the portions originating from each winding. Since the portion of the low-voltage winding 81 is small, the internal emf approximately corresponds to the voltage on the low-voltage side.

This has consequences for the thermal response of the transformer 8, 8', specifically in particular for those transformer designs which have interspaces between the windings, such as cast-resin transformers with forced cooling, for example. Owing to the air gaps for the forced cooling between the core and the windings, these regions are decoupled thermally from one another to a considerable degree. The heating of the transformer core with the limbs 80 is independent of that of the winding 81, 82, 82'. The heating of the windings 81, 82, 82' is produced depending on the current flowing through said windings, i.e. the current loading, while the heating of the core (illustrated as the transformer limb 80) is determined substantially by magnetic losses in the core. These magnetic losses change depending on the internal emf (which approximately corresponds to the voltage on the low side, as has been mentioned). This arrangement therefore means that the core of the transformer can be heated considerably and overheated without any load, i.e. off load.

The invention therefore provides that the load flow is thus passed through the transformer 8, 8' by changing the reactive component in order to provide protection against excessive heating, to be precise in such a way that an excessively high internal emf is avoided during continuous operation. The risk of overheating even on a low load or even off load is therefore avoided. Preferably, provision is furthermore made for the core and the windings to be monitored with dedicated temperature sensors (see FIG. 6) for safety reasons.

Figure 5:
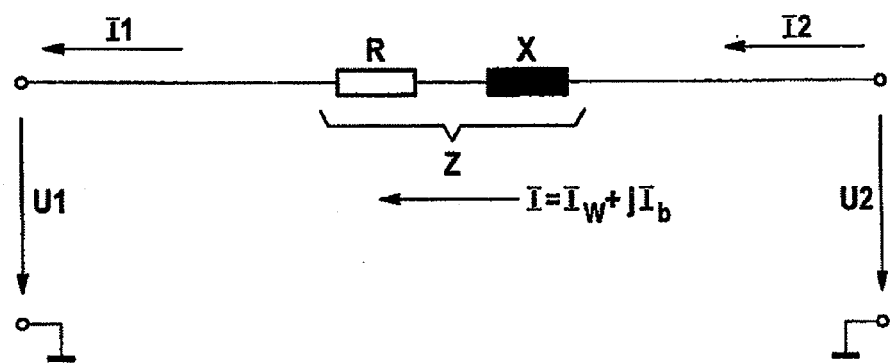
FIG. 5 shows a simplified equivalent circuit diagram of the transformer.

Owing to these relationships, the invention envisages protection of the transformer from damaging overvoltage and overheating. This will be explained with reference to a further simplified example in FIG. 5, in which the transformer 8, 8', instead of the equivalent circuit diagram shown in FIG. 3A, has been replaced by a simple series circuit comprising a resistance R and a reactance X, which are combined to form a complex impedance Z. This readily results in the voltage on the low-voltage side U2 as a sum of the voltage on the high-voltage side U1 plus the voltage drop across the complex impedance Z, i.e.:

$$U2 = U1 + Z^*I, \text{ where } Z = R + j^*X \text{ and}$$

$$I = Iw + j^*Ib.$$

In this case, it is assumed for the reactive current, as in the generator reference-arrow system, that an overexcited reactive current is negative. This means that each overexcited reactive current becomes negative and the overexcited reactive power becomes positive. Combining the above equations results in the following:

$$U2 = (U1 + R^*Iw - X^*Ib) + j^*(X^*Iw + R^*Ib).$$

The first term in front of the central plus sign is the real part and, as a result of the very low nonreactive resistance R, can be simplified to U1−X*Ib. The term after the central plus sign is the imaginary part and only represents an angular rotation in the phasor diagram which only slightly influences the magnitude of the voltage and is therefore ignored. The formula is therefore simplified to:

$$U2 = U1 - X^*Ib.$$

It can readily be seen from the formula that if Ib is negative, i.e. in the event of overexcitation, the voltage U2 is increased and, if Ib is positive, i.e. in the event of underexcitation, the voltage U2 is lowered.

The invention has identified that efficient and less complex closed-loop control or protective function can be achieved on the basis of this simplification for the transformer. This will be explained below with reference to two exemplary embodiments.

Figure 6:
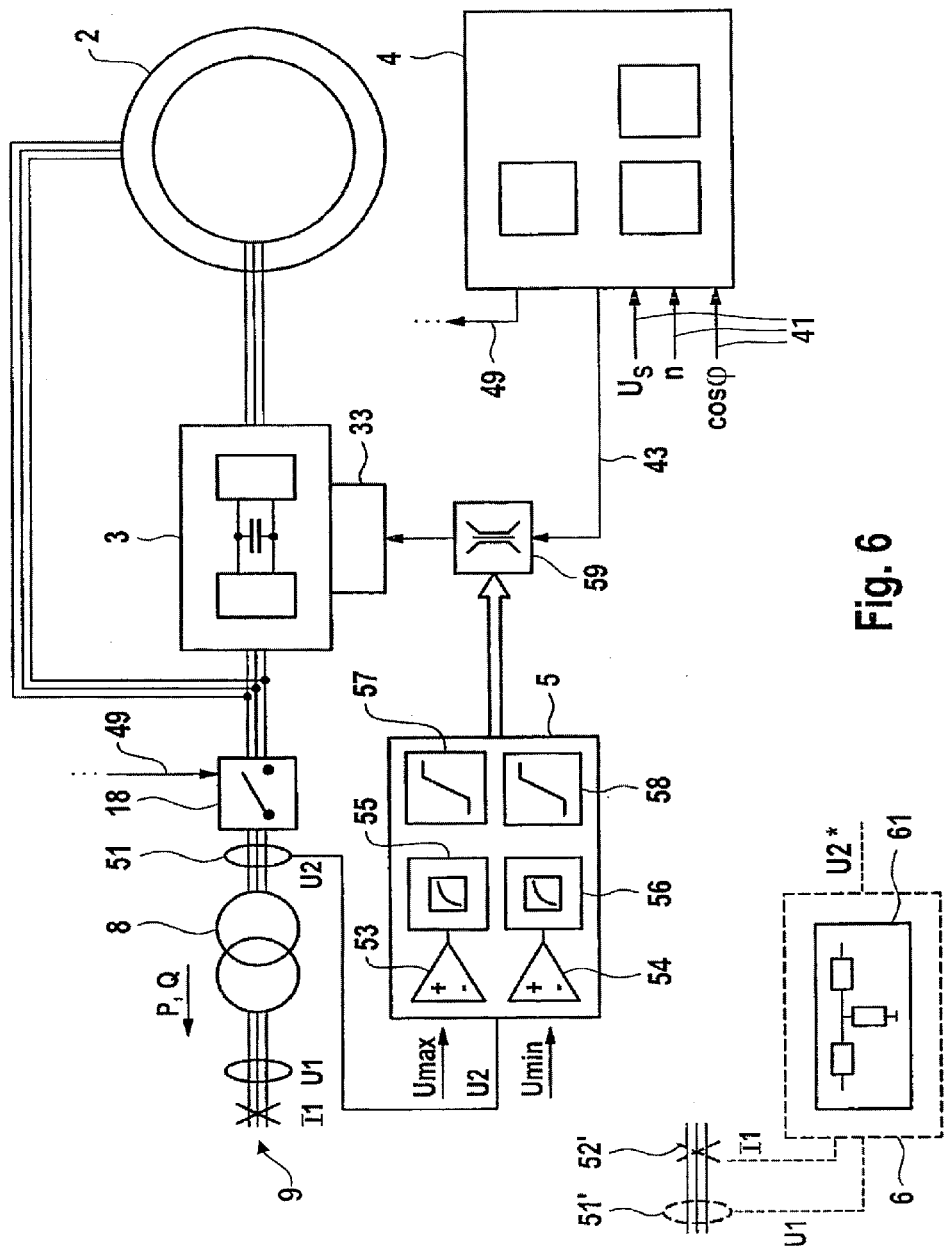
FIG. 6 shows a block diagram of a first exemplary embodiment of the invention.

FIG. 6 shows a block diagram of a first exemplary embodiment of the invention. It shows, schematically, the generator 2, the converter 3 and the transformer 8, via which the electrical energy produced by the generator 2 is fed into the power supply system 9. Also illustrated is the open-loop control system 4, which acts as open-loop operation control unit for the wind energy installation. It has a plurality of inputs 41 for operational and setpoint variables, such as voltage $U_s$, speed n and power factors cos φ. For adjusting the reactive current, a line for a reactive component actuating signal 43 is provided which is connected to the converter 3, more precisely to a rapid-response closed-loop converter control unit 33, which actuates the active switches of the converter 3 depending on the adjusted signal for the reactive power component in order to adjust a corresponding phase angle for producing the desired reactive current (or reactive power). To this extent, the arrangement is known. A system circuit breaker 18 is also provided on the transformer 8. This is actuated via an open-loop control line 49 by the open-loop operation control unit 4. This is also known.

In accordance with the invention, a sensor 51 for the voltage at the low-voltage winding 81 is provided on the transformer 8, in the exemplary embodiment illustrated on the low-voltage side. It is applied as an input signal to a setpoint value shifter 5. The setpoint value shifter 5 comprises a closed-loop control core 55 with a differential element 53 connected upstream. In this case, the signal for the measured voltage on the low side is applied to an input value of the differential element and a signal for the maximum permissible low voltage Umax is applied to the other input value. The differential signal is applied to the input of the closed-loop control core 55. This closed-loop control core 55 is in the form of a PI controller in the exemplary embodiment illustrated. The controlled variable output by said PI controller is a reactive current measure, which is applied to a limiter 57 and is limited there to values between a maximum permissible maximum reactive current $Ib_{max}$ and a minimum permissible reactive current $Ib_{min}$. The setpoint value shifter 5 has a second parallel branch, which has, correspondingly, a differential element 54, a closed-loop control core 56 and a limiter 58. The differential element 54 forms the difference with respect to a minimum value for the low voltage Umin. The closed-loop control core 56 and the limiter 58 are designed as in the first branch.

The respectively produced output values are applied as an output vector of the setpoint value shifter 5 to a feedforward module. In the exemplary embodiment illustrated, the feedforward module is in the form of a limitation module 59, which modifies the reactive component actuating signal 43 applied to the closed-loop converter control unit 33 by the open-loop operation control unit 4. This takes place in such a way that, depending on the voltage measured via the sensor 51 on the low side, the value for the maximum or at least permissible reactive current measure is limited, and the signal limited in this way is applied as modified reactive current measure to the closed-loop converter control unit 33. Thus, the reactive current flow Q through the transformer 8 is restricted depending on the voltage in such a way that a permissible tolerance zone for a safe operating range is adhered to. By virtue of the voltage limitation of the controller 55, 56 measuring the critical voltage on the low-voltage side by means of the sensor 51 and comparing said voltage with fixed setpoint values for the undervoltage and overvoltage of, for example, 90% and 110%, respectively, by means of the differential elements 53, 54, the reactive current which is still permissible in the respective operating point can be adjusted in a targeted manner.

One disadvantage with this exemplary embodiment is that a measurement point 51 is required on the low-voltage side of the transformer 8, which would otherwise not be necessary per se. In order to save on the additional complexity involved for this measurement point, it is possible, as an alternative, for a conversion module 6 to be provided. It substantially comprises a model element 61, which contains a section model of the transformer 8 without additional sensors being required for this purpose. This can be used to determine the corresponding parameter U2* on the low-voltage side from measured values for the current T1 and possibly the voltage U1 by means of sensors 51 which are generally provided in any case on the high-voltage side of the transformer 8 without additional sensors being required for this purpose. In this case, the setpoint value shifter 5 therefore does not operate with actual measured values, but with calculated equivalent variables (denoted by an * in FIG. 6). The setpoint value shifter 5 according to the invention is in this case sufficiently robust to tolerate relatively small discrepancies which unavoidably result therefrom. Therefore, this variant of the first exemplary embodiment achieves the full effect according to the invention without additional sensory technology being required for this purpose.

Figure 7:
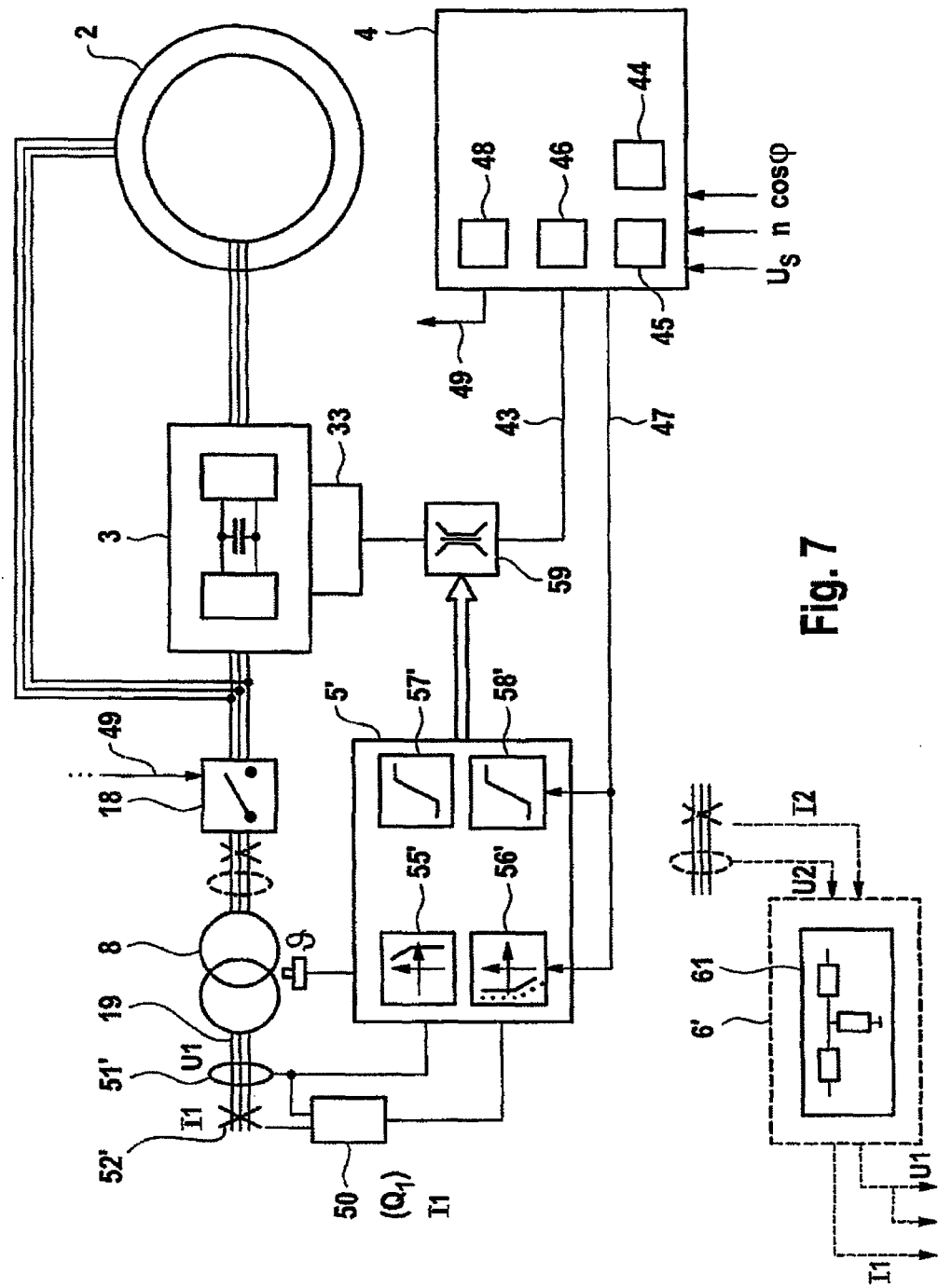
FIG. 7 shows a block diagram of a second exemplary embodiment of the invention.

A second exemplary embodiment of the invention is illustrated in FIG. 7. It differs from the first exemplary embodiment illustrated in FIG. 6 substantially in the embodiment of the setpoint value shifter 5' and other measurement points 51', 52'. Moreover, the same elements are provided with the same reference symbols. As is also the case with the first exemplary embodiment, the open-loop operation control unit 4 controls the converter 3 in a manner known per se via a reactive power actuating signal 43, which is applied to the rapid-response changeover closed-loop control unit 34.

The measurement points for the setpoint value shifter 5' are arranged on the system side of the transformer 8, to be precise in the region of the connection of the system feed line 19. A measurement point for the voltage 51' and a measurement point for the current 52' are provided. The voltage signal is applied directly to the setpoint value shifter 5'. Furthermore, it is connected, together with the current signal, to a calculation element 50, which determines a measure for the reactive power Q1 actually output by the transformer 8 to the power supply system 9 or the reactive current Ib1 from these two variables taking into consideration the phase shift between the voltage and the current. The measure is likewise applied to the setpoint value shifter 5'. The setpoint value shifter 5' contains an open-loop control core. In the exemplary embodiment illustrated, it is in the form of a characteristic element 55' with a two-loop structure. The upper branch for overvoltage will be explained first. In each case one signal for the measured voltage U1 and the measured reactive power Q1 or the reactive current Ib1 is applied to the inputs of the characteristic element 55'. The open-loop control element 55' is in the form of a characteristic element and has nonlinear open-loop control curves. The open-loop control curves are expediently fixed in such a way that, in the upper branch for overvoltage, an arm provides a constant reactive current in the case of a voltage below or up to and including the rated voltage, while the reactive current is reduced linearly as the voltage rises above this. Correspondingly, the open-loop control curve of the lower branch is configured such that, in the case of a voltage above the rated voltage and also slightly below the rated voltage, the reactive current is at a constant value, while the reactive current is increased in the case of an even lower voltage. In this case, the curve is in the capacitive range in the case of the overvoltage and in the inductive range in the case of the undervoltage. An advantage of this variant consists in the fact that it is not necessary for any controller parameters to be determined and that very rapid matching can follow since, in contrast to closed-loop control, open-loop control does not have any delays related to closed-loop control technology. FIGS. 8*a* and *b* show examples of such an open-loop control curve. It is noted that the sections illustrated vertically are preferably not precisely vertical but have a finite gradient with the same mathematical sign as the gradient in the inclined sections. Monotonicity is thus achieved, and this has a favorable effect on the stability of the open-loop control.

The use of an open-loop control unit for the setpoint value shifter 5 furthermore provides, the particular advantage which deserves possibly independent protection that additional functions can also be implemented in the open-loop control unit characteristics. For example, particular provision can be made for the open-loop control unit to also be used for compensating for dynamic overvoltage or undervoltage as a result of its good dynamic response. It is thus possible for provision to be made for underexcited reactive current to be provided immediately in the event of a short-term overvoltage in the power supply system (HVRT=high voltage ride through) by means of the open-loop control curves. This counteracts the excessive increase in voltage. This decreases both the voltage in the upstream power supply system 9 (owing to the voltage drop at system reactances) and in the interior of the wind energy installation 1 (to be precise owing to the voltage drop across the transformer 8) and, in the event of the double-fed system (as illustrated here), additionally also at the machine-side part of the converter 3 (owing to the voltage drop at reactances of the generator 2). An overvoltage in the high-voltage power supply system of, for example 130% of the rated voltage is continuously decreased thereby in the medium-voltage power supply system to values of, for example, only 120% of the rated voltage and, within the wind energy installation 1, on the low-voltage side, to values of only approximately 115%.

This effect can be intensified by virtue of the fact that, for a short period of time, a very high reactive current, i.e. a reactive current which goes beyond the rated current, is permitted. Then an even greater reduction in the overvoltage can be achieved. The same applies to the case of undervoltages in the power supply system (LVRT=low voltage ride through). The open-loop control curve in this case immediately ensures overexcited reactive current, which has the effect of increasing the voltage. As a result, the voltage level both in the upstream power supply system 9 and in the interior of the wind energy installation 1 and, in the case of the double-fed system, additionally also on the machine-side part of the converter 3 is increased. Undervoltages in the power supply system continue to be decreased thereby in the direction of the wind energy installation. Such an open-loop curve implementation in which provisions are made both for HVRT and for LVRT is illustrated in FIG. 9. The unhatched regions in this case indicate the operational range of the wind energy installation.

In each case one limiter module 57', 58' is connected downstream of the characteristic element 55', 56'. Said limiter module 57', 58' restricts the output setpoint values for reactive current or reactive power to a permissible minimum or maximum value. The two values output by the upper and lower branch are applied as limiting vector to a limitation module 59, which is included in the signal line for the reactive power actuating signal 43. The reactive component actuating signal transmitted by the open-loop operation control unit 4 for the reactive power or the reactive current is thus corrected by the setpoint value shifter according to the invention.

In order to further improve the reaction to short-term faults, provision can be made for additional dynamic characteristics to be programmed into the characteristic elements. This will be explained using the example of the characteristic element 56'. Said characteristic element 56' also contains a second characteristic (illustrated by dotted lines in FIG. 7) which provides extended limit values for short-term operation. The characteristic element 56' switches over to this second characteristic if a corresponding switchover signal is applied via an open-loop control line 47. The open-loop control line 47 is connected to a dynamic open-loop control module 46. In the exemplary embodiment illustrated, it is arranged on the open-loop operation control unit 4. However, this does not necessarily need to be the case, rather it is also possible for it to be in the form of an autonomous module or for it to be in the form of an additional functional module at the setpoint value shifter 5'. The latter provides the advantage of short signal paths, with the result that, particularly in the case of high dynamics, such as short-term system faults (LVRT or HRVT), a rapid response is ensured. The drive signal generated by the dynamic module 46 is also applied to the limiter 58' via the open-loop control line 47 and has the effect that said limiter switches over to extended limit values. The resultant extended open-loop control curve is illustrated by dotted lines in FIG. 8*a*. The region up to the cross-hatching is obtained by this measure additionally for short-term operation. It is noted that a corresponding extension for dynamic operation can also be provided at the upper voltage limit (not illustrated).

As is also the case for the first embodiment discussed above, it is not absolutely necessary for the measurement sensors for voltage or current 51', 52' to be arranged on the high-voltage side of the transformer 8. Provision can also be made for them to be provided on the low-voltage side, in particular when corresponding sensors are already present there in any case. In this case, a conversion module 6 is expediently provided which comprises a section model 61' of the transformer 8. Corresponding values can be obtained on the high-voltage side from the values measured on the low-voltage side by means of this conversion module 6.

The setpoint value shifter 5 preferably acts directly on the converter 3. In principle, a direct action on the individual switching elements (IGBTs) can be provided, but indirect action on the closed-loop converter control unit 33 is preferred. It usually has very high dynamics. The changes in the setpoint values, which changes are predetermined by the setpoint value shifter 5, can be converted quickly thereby, with the result that the above-described dynamic compensation capacity is achieved. However, it may arise in this case that the operational state set by the rapid-response closed-loop control unit 33 of the converter 3 deviates from that which is predetermined by the open-loop operation control unit 4 under the influence of the setpoint value shifter 5. In order to avoid permanent discrepancies between the state in accordance with the open-loop operation control unit 4 and the actual state of the converter 3, provision is expediently made for a functionality designed corresponding to the setpoint value shifter 5 to be provided in the open-loop operation control unit 4. For this purpose, the operation control unit 4 preferably has a monitoring module 45. The monitoring module 45, in the same way as the setpoint value shifter 5, determines changes for the reactive component which are then taken into consideration by the open-loop operation control unit 4. Preferably, the open-loop operation control unit 4 furthermore has a load shifting module 44. It is designed such that, in the event of an overvoltage or undervoltage, it acts on the remaining open-loop operation control unit 4 in such a way that the active portion of the output power is reduced in favor of the reactive portion. Thus, capacitance can be obtained on the bus-bar in order to feed a higher reactive current. This is particularly suitable for compensating for dynamic change, such as in the case of a short-term dynamic overvoltage (HVRT) and undervoltage (LVRT).

Furthermore, the monitoring module 45 can interact with an isolating module 48 such that it drives the system protection relay 18 with a variable limit value, the limit value also being determined by the output reactive current. The invention therefore takes into account the knowledge that the power of the transformer 8 is also determined critically by the internal emf, which in turn is primarily dependent on the voltage on the low side and virtually independent of the transmitted power. The risk which has existed to date of it being possible for impermissible heating of the transformer 8 to arise even in the event of a low load is therefore counteracted or, if required, shut-down is performed.

The mode of operation and the effect of the invention will be explained in more detail below with reference to FIG. 10. The figure illustrates, in the coordinate system, the rated reactive power on the X axis and the rated voltage on the Y axis. In each case, the continuous lines indicate the system voltage on the high-voltage side and the dashed lines indicate the voltage on the low-voltage side of the transformer 8. The permissible range of the voltage discrepancies is fixed on the system side to +/−10% in the case of a rated reactive power ($Q/Q_{rated}$), which can be up to 0.45, both capacitively and inductively. This results in a rectangle for the permissible operating range. There is now the problem that a shift in the rectangle arises as a result of the voltage drops across the transformer 8. The voltages on the low-voltage side of the transformer 8 differ (see thin lines in FIG. 10A) and can be up to 15% above the rated value, in particular in the case of the overvoltage at a reactive power which increases the voltage, and can be up to 30% below the rated value in the case of the undervoltage at a reactive power which reduces the voltage. Sufficient protection of the wind energy installation against overvoltage or undervoltage is therefore no longer ensured.

There is a very similar situation if the basis used is not the situation on the system side (high-voltage side) of the transformer 8, but that on the low-voltage side of the transformer 8 (see thin lines in FIG. 10A). The permissible operating range is represented by the rectangle, which represents the conditions on the low-voltage side. It can be seen that impermissibly high or low voltages can occur on the system side.

The improvement which can be achieved by the invention is illustrated by bold lines. The voltage/reactive power graph is optimized to the extent that the voltages on the system side are restricted, to be precise in relation to the upper voltage value in the case of reactive power which increases the voltage and with respect to the lower voltage value in the case of reactive power which decreases the voltage. This results in a characteristic configuration, which approximates a rhombus, of the peripheral lines of the permissible operating range. It can be seen from FIG. 10A that, given the correct choice of parameters, tipping by the transformer (dashed bold line) no longer results in impermissibly high values for the voltage discrepancy being reached, to be precise neither in the case of an overvoltage nor in the case of an undervoltage. Instead, the voltages remain in the permissible range. The invention therefore achieves the situation in which the input value is adhered to both on the system side of the transformer 8 and on the wind energy installation side. The same applies, as can be seen from FIG. 10B, if the conditions on the low-voltage side 8 are used as a basis. Correspondingly (see dashed thick line), the overvoltage is restricted in the event of reactive power which increases the voltage and, in a similar manner to this, the undervoltage is restricted in the event of reactive power which decreases the voltage.

The invention claimed is:

1. A wind energy installation comprising:
   a rotor;
   a generator driven by the rotor and having a converter configured to generate electrical power which is output into a power supply system via a transformer;
   an open-loop control system comprising an open-loop converter control unit, the open-loop control system supplying an actuating signal for a reactive component to the converter; and
   a voltage measurement device arranged on the transformer, a voltage signal of the voltage measurement device being applied to an input of a state-dependent setpoint value shifter configured to shift the reactive component in the event of an overvoltage toward an underexcited status and in the event of an undervoltage toward an overexcited status, the output signal of the setpoint value shifter being applied to a limitation module for the reactive component acting on the converter, the limitation module limiting the reactive component actuating signal supplied by the open-loop control system.

2. The wind energy installation of claim 1, wherein the setpoint value shifter interacts with a load shifting module, which acts on the open-loop control system in the event of an undervoltage or overvoltage in such a way that the active portion of the output power is reduced in favor of the reactive portion.

3. The wind energy installation of claim 1, comprising a temperature sensor for a core of the transformer, the signal from the temperature sensor being applied, as a state signal, to an input of the setpoint value shifter.

4. The wind energy installation of claim 1, wherein the open-loop control system has a monitoring module comprising a second setpoint value shifter identical to the state-dependent setpoint value shifter.

5. The wind energy installation of claim 1, wherein the open-loop control system comprises an isolating module with a variable limit value which acts on a system protection relay at the transformer and whose limit value is determined by the output reactive power.

6. The wind energy installation of claim 1, wherein the setpoint value shifter interacts with a section model of the transformer, to which the voltage on one side of the transformer is applied in order to determine the voltage on the other side of the transformer.

7. The wind energy installation of claim 6, wherein the section model is configured for corresponding reactive component determination.

8. The wind energy installation of claim 1, wherein the setpoint value shifter comprises a PI controller.

9. The wind energy installation of claim 8, wherein the PI controller determines a correction value for the reactive component from a voltage difference with respect to a limit value.

10. The wind energy installation of claim 1, wherein the setpoint value shifter comprises an open-loop control element.

11. The wind energy installation of claim 10, wherein the open-loop control element determines a reactive power correction value from applied signals for voltage and reactive power.

12. The wind energy installation of claim 10, wherein the open-loop control element is a two-dimensional characteristic element with monotonically falling characteristics.

13. The wind energy installation of claim 10, wherein the open-loop control element has a setpoint value matrix.

14. The wind energy installation of claim 8, comprising a two-loop structure with one loop for overvoltage and one for undervoltage.

15. The wind energy installation of claim 8, comprising a switchover device which enables short-term operation with extended limit values.

16. The wind energy installation of claim 1, wherein the setpoint value shifter acts directly on the converter.

17. A method for operating a wind energy installation including a rotor, a generator driven by the rotor and having a converter configured to generate electrical power which is output into a power supply system via a transformer, and an open-loop control system comprising an open-loop converter control unit with adjustment of an actuating signal for a reactive component of the output power, comprising:

measuring a voltage across the transformer;

determining a correction signal for the degree of reactive power using a state-dependent setpoint value shifter configured to shift the reactive component in the event of an overvoltage toward an underexcited status and in the event of an undervoltage toward an overexcited status; and using the shifted signal to limit the actuating signal of the reactive component.

* * * * *